2,859,138
COMPOSITION AND METHOD FOR COATING A CERAMIC BODY

Melbourne K. Blanchard, Milwaukee, Wis., assignor to the United States of America as represented by the United States Atomic Energy Commission No Drawing. Application September 30, 1953
Serial No. 383,421

6 Claims. (Cl. 117—169)

My invention relates to an improved composition and method for coating a ceramic body, and more particularly to an improved composition and method for coating a beryllium carbide-carbon body.

In addition to other high temperature uses, beryllium carbide-carbon, commonly containing approximately 10% to approximately 30% carbon, as free graphite, by weight, may be employed as a moderator in a neutronic reactor. This particular composition displays excellent neutron moderating properties, has a low neutron absorption cross section and is generally characterized by stability to chemical and physical attack. However, in reactors operating at high temperatures or employing high velocity coolant gases, undesirable tendencies toward oxidation and/or erosion are revealed. This becomes particularly serious when the fissionable fuel is disposed within the moderator matrix, for loss of costly fuel and escape of dangerous radioactive fission products may occur.

One of the measures taken by the prior art to protect $Be_2C$—C involves coating with ceramic materials. An ideal coating for such use should possess the following properties: a high melting point for operation at elevated temperatures; non-tackiness, in order to minimize the sticking together of adjacent coated surfaces; resistance to significant phase changes if crystalline, and to devitrification if glassy; chemical stability towards the coolant gas; a coefficient of expansion similar to that of the underbody so that good adherence is maintained with rapid heating and cooling; good mechanical strength and thermal shock resistance; and an average low neutron absorption cross section.

Generally available commercial coatings have not been found suitable for $Be_2C$—C, failing to meet some or all of the foregoing highly specific requirements for an ideal coating. Thus, among the coatings which have been tried are high silica-content glazes which comprise approximately 75%–100% silica, and the remainder basic oxides and/or phosphates.

An object of my invention, therefore, is to provide an improved method of protecting a beryllium carbide-carbon body.

Another object is to provide a method of protecting a berryllium carbide-carbon from severe chemical and physical attack at elevated temperatures.

Another object is to provide an improved vitreous coating on a beryllium carbide-carbon body.

Still another object is to provide an improved vitreous coating on a beryllium carbide-carbon body which is capable of protecting same from severe chemical and physical attack and which is non-tacky and oxidation and thermal shock-resistant.

Additional objects and advantages of my invention will become apparent from the following description and the claims appended hereto.

In accordance with my present invention, an improved method of protecting a beryllium carbide-carbon body comprises coating said body with a mixture comprising, by ratio, approximately 0.8 to approximately 2.4 moles of at least one basic oxide component, approximately 0.1 to approximately 0.6 mole of at least one amphoteric oxide component, and approximately 1.5 to approximately 3.5 moles of at least one acidic oxide component, and heating the resulting coated body at a vitrifying temperature.

The practice of my invention provides a highly-adherent, non-tacky, oxidation and thermal shock-resistant, vitreous coating on a beryllium carbide-carbon body which will protect same from the action of high velocity gases at elevated temperatures for extended periods of time.

Suitable basic oxides for use in my invention are $BaO$, $MgO$, $CaO$, $SrO$, $Na_2O$, $K_2O$, $Li_2O$, and $CeO_2$; suitable amphoteric oxides are $Al_2O_3$, $Cr_2O_3$, $Fe_2O_3$, $GeO_2$ and $SnO_2$; and suitable acidic oxides are $SiO_2$, $ZrO_2$, $TiO_2$, $Nb_2O_5$ and $B_2O_3$. I find, however, that $CaO$ is preferred as the major basic oxide component in my coating, $Al_2O_3$ is preferred as the major amphoteric oxide component, and $SiO_2$ is preferred as the major acidic oxide component.

While any combinations of the above oxides, in accordance with my invention, will form an eminently satisfactory coating, unexpectedly advantageous results may be obtained by employing the composition shown in column I of Table I, below, while a specific composition of this coating is preferred as shown in column II.

TABLE I

| Component | Weight Percent | |
|---|---|---|
| | I | II |
| $SiO_2$ | 30–65 | 50 |
| $Al_2O_3$ | 3–17 | 5 |
| $Na_2O$ | 5–15 | 11 |
| $Li_2O$ | 2–7 | 4 |
| $BaO$ | 1–5 | 3 |
| $TiO_2$ | 3–15 | 7 |
| $CaO$ | 10–46 | 20 |

Although the components of my coating are disclosed above in the oxide form, they may initially be present in other suitable forms, such as carbonates, which upon heating are converted into oxides.

When $CaO$ is employed in my coating composition, it may be either included in the batch composition prior to any fritting or calcining or afterwards as a raw mill addition, but the former is preferred since a raw mill addition of $CaO$ requires that the resulting aqueous suspension (herein referred to as a "slip") be stirred constantly to prevent rapid settling of glaze ingredients and results in uneven drainage upon application to the underbody. The addition of $BaCl_2$ to the slip helps to maintain the suspension when a raw mill addition of $CaCO_3$ is employed, but does not improve the drainage characteristics.

While a satisfactory coating may be formed on an untreated $Be_2C$—C body, I find that coatings having improved adhesion and decreased globule formation characteristics are obtainable by first subjecting the $Be_2C$—C body to a short firing under oxidizing conditions.

The optimum length of the oxidizing treatment may vary depending upon the exact chemical composition of the $Be_2C$—C body and its size and shape. Generally, however, treatment in air at a temperature of approximately 1850° F. to approximately 2250° F. for approximately one to five minutes is satisfactory. Caution must be exercised, however, in the employment of this technique, for excessive oxidation might subsequently result in flaking of the coating from the underbody.

While the reaction mechanism of the oxidizing treatment is unknown, it appears that partial conversion of surface beryllium carbide to beryllium oxide occurs, and the refractory oxide thus formed is either soluble in the ceramic glaze material during the firing of the glaze or is at least more compatible with the glaze than is carbon or $Be_2C$. More particularly, it appears that CaO, and to some extent $CeO_2$, MgO, $Mb_2O_5$ and $La_2O_3$, act as fluxing agents when present, absorbing a certain amount of BeO and thereby reducing the melting point of the glaze sufficiently to permit it to cover the specimen surface before destructive oxidation of the underbody takes place to any appreciable extent. Further adsorption of BeO then raises the melting point until the coating is refractory and non-tacky at about 2500° F.

Numerous methods may be employed for preparing and applying my coating on $Be_2C$—C, and the particular method employed is not critical. However, particularly satisfactory results may be obtained by thoroughly mixing the batch components, fritting the resulting mixture, grinding the resulting frit to a fine particle size, forming an aqueous suspension (slip) from the resulting ground frit, and applying the slip on the beryllium carbide-carbon underbody by dipping, spraying, or brushing. The coating may be permitted to dry at either room or elevated temperatures, but preferably at a temperature not in excess of approximately 300° F.

The dried, coated $Be_2C$—C body may be fired by various techniques to vitrify the coating thereon and the employment of a particular method is not critical. Thus, the coated body may be fired in a gas-fired kiln in an atmosphere of combustion products at a temperature of approximately 2500° F. to 2800° F. until the coating is vitrified. Also, more satisfactorily, the coated body may be fired in a Globar furnace in air at a temperature of approximately 2100° F. to approximately 2400° F. for approximately 10-20 minutes followed by a firing at approximately 2700° F.-2900° F. for approximately 25-35 minutes. However, the method taught in co-pending application S. N. 383,422, entitled "Method of Vitrifying Coatings," filed September 30, 1953, in the name of Murray A. Schwartz, is preferred. Briefly this method employs a two-step firing technique, an initial firing in a resistance-type furnace for approximately 15-30 minutes at approximately 2400° F.-2700° F., followed by a second firing in an induction-type furnace for approximately 20-40 minutes at approximately 2750° F.-2950° F., both firings conducted preferably in a reducing atmosphere.

While the employment of my invention provides an unexpectedly fine coating on $Be_2C$—C which will provide same with protection heretofore unattainable under severe operating conditions, I find that a slight further improvement may be obtained by applying certain overcoatings upon my primary coating. Table II, below, shows the composition of various suitable overcoatings.

TABLE II

Overcoatings

| Glaze No. | $CaCO_3$ | $Al_2O_3$ | $SiO_2$ | $SrCO_3$ |
| --- | --- | --- | --- | --- |
| 1 | 7.56 | 16.92 | 63.50 | 12.05 |
| 2 | 6.74 | 15.10 | 56.66 | 21.48 |
| 3 | 62.28 | 18.40 | 10.15 | 9.03 |
| 4 | 57.20 | 16.90 | 9.32 | 16.58 |
| 5 | 61.60 | 6.37 | 22.92 | 9.08 |
| 6 | 56.40 | 5.85 | 21.08 | 16.65 |
| 7 | 3.09 | 17.25 | 67.25 | 12.31 |
| 8 | 2.75 | 15.36 | 60.00 | 21.86 |
| 9 | 76.40 |  | 15.35 | 8.28 |

The above overcoatings may be prepared as uncalcined or as calcined water suspensions. Uncalcined overcoatings are prepared by thoroughly mixing the components, grinding and forming an aqueous suspension of the resulting mixture. The calcined overcoatings are prepared by mixing batch ingredients, drying, firing to approximately 2500° F., grinding the fired mixture to approximately −80 mesh and forming an aqueous suspension of the resulting mixture.

The resulting calcined or uncalcined overcoating slips may be applied to a $Be_2C$—C body, already coated with my primary coating composition, by conventional techniques and fired at a temperature of approximately 2800° F. to 3300° F. until the overcoating is vitrified.

In order to point out more fully the nature of my invention, the following examples are offered.

EXAMPLES 1-6

Beryllium carbide-carbon bodies containing approximately 10% carbon, by weight, and having dimensions of approximately ¾" x ½" x 3/16" were cut from hot-pressed bars of $be_2C$—C with a diamond cutting wheel using a cutting oil lubricant. These samples were degreased by immersion for ten minutes in boiling $CCl_4$, followed by a ten minute bath in $CCl_4$ fumes. The samples were then placed in a drying oven at 250° F. for 30 minutes to remove excess $CCl_4$. After drying, the bodies were subjected to an oxidizing fire at a temperature of 2000° F. for 4 minutes.

Two-thousand gram batches of the compositions shown in Table III, below, were fritted according to the following method. Each batch was thoroughly mixed, placed in a clay crucible within a Globar furnace and brought up to a temperature of 1700° F. in about 6 hours, and soaked at that temperature for approximately 14 hours. The temperature was then raised, in another 4 hours, to 2400° F., and the resulting melt was slowly poured into a pan of constantly stirred cold water. The resulting clear, glassy frits were then dried at 225° F.

TABLE III

Parts by weight (percent)

|  | Examples |  |  |  |  |  |
| --- | --- | --- | --- | --- | --- | --- |
|  | 1 | 2 | 3 | 4 | 5 | 6 |
| $SiO_2$ | 50.2 | 33.8 | 37.6 | 50.2 | 50.2 | 51.5 |
| $TiO_2$ | 6.8 | 4.6 | 5.1 | 6.8 | 6.8 | 15.0 |
| $Li_2O$ | 4.4 | 3.0 | 3.3 | 4.4 | 4.4 | 4.7 |
| BaO | 2.8 | 1.9 | 2.1 | 2.8 | 2.8 | 2.9 |
| $Na_2O$ | 10.6 | 7.2 | 7.8 | 10.6 | 10.6 | 10.9 |
| $Al_2O_3$ | 5.0 | 3.4 | 4.1 | 5.0 | 5.0 | 5.2 |
| CaO | 20.0 | 46.0 | 20.0 | 18.0 | 16.0 |  |
| $Nb_2O_5$ |  |  | 20.0 | 2.0 | 4.0 | 10.0 |

Mixtures of one hundred parts, by weight, of each of the frits, 0.25 part of $NaNO_2$ and 120 parts water, were ground in a ball mill, using porcelain balls, for approximately 24 hours at the end of which time the fritted glasses had been ground to −100 mesh size. The coating slips, prepared in this manner, were then poured through a 30-mesh screen in order to remove caked or agglomerated material.

A few drops of dioctyl sodium sulfosuccinate, a wetting agent, were added to each of the slips to provide continuous surface wetting of the $Be_2C$-carbon bodies. The $Be_2C$-carbon bodies were dipped into the slips, excess material allowed to drain-off, and then dried at 300° F. for 15 minutes. The resulting beryllium carbide bodies were placed directly in the hot zone of a molybdenum-resistance furnace, having a hydrogen atmosphere, and maintained at a temperature of 2650° F. as measured by an optical pyrometer. After heating at the latter temperature for a period of 30 minutes the coatings were partially vitrified and the bodies were withdrawn from the furnace onto a water-cooled plate, and cooled to the ambient atmospheric temperature. The resulting coated bodies were then placed within an induction furnace, in a hydrogen atmosphere, and the temperature was brought up to approximately 2805° F., as measured by an optical pyrometer, and maintained there for a period of 30 minutes.

The resulting coatings were completely vitrified, non-tacky and adherent to the underbody. They provided excellent oxidation protection for $Be_2C$—C and withstood repeated thermal shock cycles without cracking.

In more detail, the specimen coated with my preferred coating composition shown in Example 1, and also blank specimens, were given oxidation tests, to determine the protective properties of the coating. The samples were placed in a Globar furnace at 2500° F. with one liter of air per minute passing over them. After 155 hours the blank specimen showed 37 mils of oxide thickness and the coated specimen only 2.4 mils, indicating excellent oxidation resistance. In a sticking test, two coated samples were pressed together under 150 p. s. i. at 2500° F. for 1 hour. After this time the coated objects either fell apart or could be separated with very slight finger pressure. The thinness of the coating, approximately 1.5 mils, aided considerably in eliminating thermal shock problems.

It should be understood that the above examples are merely illustrative and should not be considered as limiting the scope of my invention. In particular, variations in the method of preparing, applying and firing my coating on a $Be_2C$—C body may be made by those skilled in the ceramic art without departing from the spirit of my invention. My invention, therefore, should be understood to be limited only as is indicated by the appended claims.

Having thus described my invention, I claim the following:

1. An improved method of protecting a beryllium carbide-carbon body which comprises coating said body with a mixture consisting essentially of, by ratio, approximately 0.8 to approximately 2.4 moles of at least one basic oxide component, the major oxide of which is CaO, approximately 0.1 to approximately 0.6 mole of at least one amphoteric oxide component, the major oxide of which is $Al_2O_3$, and approximately 1.5 to approximately 3.5 moles of at least one acidic oxide component, the major oxide of which is $SiO_2$, and heating the resulting coated body at a vitrifying temperature.

2. An improved method of coating a beryllium carbide-carbon body which comprises fritting a mixture consisting essentially of, by weight, approximately: 30% to 65% $SiO_2$, 3% to 17% $Al_2O_3$, 5% to 15% $Na_2O$, 2% to 7% $Li_2O$, 1% to 5% BaO, 3% to 15% $TiO_2$, and 10% to 46% CaO, forming an aqueous suspension of the resulting frit, applying said suspension on said body, and heating the resulting coated body at a vitrifying temperature.

3. An improved method of coating a beryllium carbide body containing approximately 10% to approximately 30% carbon, by weight, which comprises fritting a mixture consisting essentially of, by weight, approximately: 50% $SiO_2$, 5% $Al_2O_3$, 11% $Na_2O$, 4% $Li_2O$, 3% BaO, 7% $TiO_2$ and 20% CaO, forming an aqueous suspension of the resulting frit, applying said suspension on said body, and heating the resulting coated body at a vitrifying temperature.

4. An improved coating composition for a beryllium carbide-carbon body consisting essentially of, by ratio, approximately 0.8 to approximately 2.4 moles of at least one basic oxide component, approximately 0.1 to approximately 0.6 mole of at least one amphoteric oxide component and approximately 1.5 to approximately 3.5 moles of at least one acidic oxide component, wherein the major basic oxide component is CaO, the major amphoteric oxide component is $Al_2O_3$ and the major acidic oxide component is $SiO_2$.

5. An improved coating composition for a beryllium carbide-carbon body consisting essentially of, by weight, approximately: 30% to 65% $SiO_2$, 3% to 17% $Al_2O_3$, 5% to 15% $Na_2O$, 2% to 7% $Li_2O$, 1% to 5% BaO, 3% to 15% $TiO_2$, and 10% to 46% CaO.

6. An improved coating composition for a beryllium carbide body containing approximately 10% to approximately 30% carbon, by weight, comprising, by weight, approximately: 50% $SiO_2$, 5% $Al_2O_3$, 11% $Na_2O$, 4% $Li_2O$, 3% BaO, 7% $TiO_2$ and 20% CaO.

References Cited in the file of this patent

UNITED STATES PATENTS

| | | |
|---|---|---|
| Re. 17,661 | Martin | May 13, 1930 |
| 2,020,559 | Malinovszky et al. | Nov. 12, 1935 |
| 2,389,386 | Russell | Nov. 20, 1945 |
| 2,579,050 | Ramsay | Dec. 18, 1951 |
| 2,663,658 | Schurect | Dec. 22, 1953 |

FOREIGN PATENTS

| | | |
|---|---|---|
| 214,492 | Switzerland | July 16, 1941 |

UNITED STATES PATENT OFFICE
CERTIFICATE OF CORRECTION

Patent No. 2,859,138                          November 4, 1958

Melbourne K. Blanchard

It is hereby certified that error appears in the printed specification of the above numbered patent requiring correction and that the said Letters Patent should read as corrected below.

Column 3, line 4, after "MgO," strike out "$Mb_2O_5$", and insert instead -- $Nb_2O_5$ --; column 4, line 10, for "$be_2C-C$" read -- $Be_2C-C$ --.

Signed and sealed this 26th day of May 1959.

(SEAL)

Attest:

KARL H. AXLINE                                    ROBERT C. WATSON

Attesting Officer                                   Commissioner of Patents